United States Patent
Hashimoto

(10) Patent No.: US 10,158,771 B2
(45) Date of Patent: Dec. 18, 2018

(54) INFORMATION PROCESSING APPARATUS THAT TRANSFERS DIAGNOSIS INFORMATION ON A UNIT TO ANOTHER UNIT THROUGH A COMMUNICATION LINE FOR CPU TO CPU COMMUNICATION, METHOD OF CONTROLLING AN INFORMATION PROCESSING APPARATUS, AND STORAGE MEDIUM

(71) Applicant: CANON KABUSHIKI KAISHA, Tokyo (JP)

(72) Inventor: Minoru Hashimoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/164,259

(22) Filed: May 25, 2016

(65) Prior Publication Data

US 2016/0352928 A1 Dec. 1, 2016

(30) Foreign Application Priority Data

Jun. 1, 2015 (JP) ................................ 2015-111575

(51) Int. Cl.
*H04N 1/00* (2006.01)
(52) U.S. Cl.
CPC ....... *H04N 1/00084* (2013.01); *H04N 1/0001* (2013.01); *H04N 1/00029* (2013.01); *H04N 1/00214* (2013.01); *H04N 2201/0039* (2013.01); *H04N 2201/0094* (2013.01)
(58) Field of Classification Search
CPC .................................................. H04N 1/00084

USPC ........................................................ 358/1.15
See application file for complete search history.

(56) References Cited

U.S. PATENT DOCUMENTS

| 6,671,060 | B1* | 12/2003 | Fresk | G06K 15/00 358/1.1 |
| 2009/0262389 | A1* | 10/2009 | Tamada | G03G 15/5004 358/1.15 |
| 2010/0027179 | A1* | 2/2010 | Di Maio | H01H 47/002 361/93.8 |
| 2013/0013947 | A1* | 1/2013 | Miyata | H04N 1/00891 713/323 |

(Continued)

FOREIGN PATENT DOCUMENTS

JP  05-324375 A  12/1993

*Primary Examiner* — Jacky X Zheng
(74) *Attorney, Agent, or Firm* — Fitzpatrick, Cella, Harper & Scinto

(57) ABSTRACT

Provided is an information processing apparatus including a first processing unit and a second processing unit. A diagnosis unit included in the first processing unit is configured to detect that communication of first information through a communication line is not performed properly, the communication of the first information being performed between a first CPU in the first processing unit and a second CPU in the second processing unit. A switch unit included in the second processing unit is configured to switch information to be transmitted through the communication line from the first information to second information in a case where it is detected that the communication of the first information through the communication line is not performed properly, the second information being transmitted to the diagnosis unit included in the first processing unit from a diagnosis unit included in the second processing unit.

15 Claims, 9 Drawing Sheets

(56) References Cited

U.S. PATENT DOCUMENTS

2013/0141751 A1* 6/2013 Hata .................. G06F 3/12
 358/1.14
2014/0297791 A1* 10/2014 Tanji .................. H04L 69/164
 709/217

* cited by examiner

INFORMATION PROCESSING APPARATUS THAT TRANSFERS DIAGNOSIS INFORMATION ON A UNIT TO ANOTHER UNIT THROUGH A COMMUNICATION LINE FOR CPU TO CPU COMMUNICATION, METHOD OF CONTROLLING AN INFORMATION PROCESSING APPARATUS, AND STORAGE MEDIUM

BACKGROUND OF THE INVENTION

Field of the Invention

The present invention relates to a technique of specifying the location of a failure in a system having a plurality of units connected by cables.

Description of the Related Art

A plurality of units are connected by cables (power cables and communication lines) inside a multifunctional peripheral (MFP) equipped with the functions of a copier, a printer, a scanner, and the like. In a case of specifying the location of a failure occurring in the MFP, the conditions of the plurality of units may be collected. In this way, the location of the failure can be specified more accurately from a narrower range. For example, in a case where a unit cannot be powered on, possible causes of that failure can be failure of that unit, as well as failure of a power supply unit, fuse blow, cable disconnection, and the like. In this case, the location of the failure can be specified by checking the power condition of the unit that cannot be powered on, as well as the power conditions of the power supply unit and other units.

In a case where diagnosis information on the inside of units is to be transferred there between, diagnosis units included in these units may be connected to each other. However, this method involves providing an additional communication line dedicated to failure diagnosis, which increases the cost. Further, if the communication line for diagnosis is added, the communication line for diagnosis itself will require diagnosis as well, which decreases the reliability. Hence, there is a demand for a technique of transferring diagnosis information between units by using an existing communication line.

Japanese Patent Laid-Open No. H05-324375(1993) discloses a technique in which diagnosis information indicating diagnosis on a unit is transferred to another unit. In the technique disclosed in Japanese Patent Laid-Open No. H05-324375(1993), the diagnosis information is superimposed onto an empty communication slot at an existing communication interface between the units if there is such an empty slot.

The technique of Japanese Patent Laid-Open No. H05-324375(1993) has a problem in that circuitry is complicated. Specifically, this technique requires circuitry configured to monitor the communication at the existing communication interface to detect whether or not there is a sufficiently large empty slot for the superimposition of the diagnosis information, and superimpose the diagnosis information.

SUMMARY OF THE INVENTION

An information processing apparatus according to the present invention is an information processing apparatus including a first processing unit and a second processing unit, the information processing apparatus comprising: a diagnosis unit configured to detect that communication of first information through a communication line is not performed properly, the communication of the first information being performed between a first CPU in the first processing unit and a second CPU in the second processing unit, and the diagnosis unit being included in the first processing unit; and a switch unit configured to switch information to be transmitted through the communication line from the first information to second information in a case where it is detected that the communication of the first information through the communication line is not performed properly, the switch unit being included in the second processing unit, and the second information being transmitted to the diagnosis unit included in the first processing unit from a diagnosis unit included in the second processing unit.

A method of controlling an information processing apparatus according to the present invention is a method of controlling an information processing apparatus including a first processing unit and a second processing unit, the method comprising: causing a diagnosis unit included in the first processing unit to detect that communication of first information through a communication line is not performed properly, the communication of the first information being performed between a first CPU in the first processing unit and a second CPU in the second processing unit; and causing a switch unit included in the second processing unit to switch information to be transmitted through the communication line from the first information to second information in a case where it is detected that the communication of the first information through the communication line is not performed properly, the second information being transmitted to the diagnosis unit included in the first processing unit from a diagnosis unit included in the second processing unit.

A non-transitory computer readable storage medium according to the present invention is a non-transitory computer readable storage medium storing a program which causes a computer to perform a method of controlling an information processing apparatus including a first processing unit and a second processing unit, the method comprising: causing a diagnosis unit included in the first processing unit to detect that communication of first information through a communication line is not performed properly, the communication of the first information being performed between a first CPU in the first processing unit and a second CPU in the second processing unit; and causing a switch unit included in the second processing unit to switch information to be transmitted through the communication line from the first information to second information in a case where it is detected that the communication of the first information through the communication line is not performed properly, the second information being transmitted to the diagnosis unit included in the first processing unit from a diagnosis unit included in the second processing unit.

Further features of the present invention will become apparent from the following description of exemplary embodiments (with reference to the attached drawings).

DESCRIPTION OF THE EMBODIMENTS

Embodiments of the present invention will be described below with reference to the drawings. Note that the configurations to be shown in the following embodiments are mere examples, and the present invention is not limited to the shown configurations.

Embodiment 1

Figure 1:
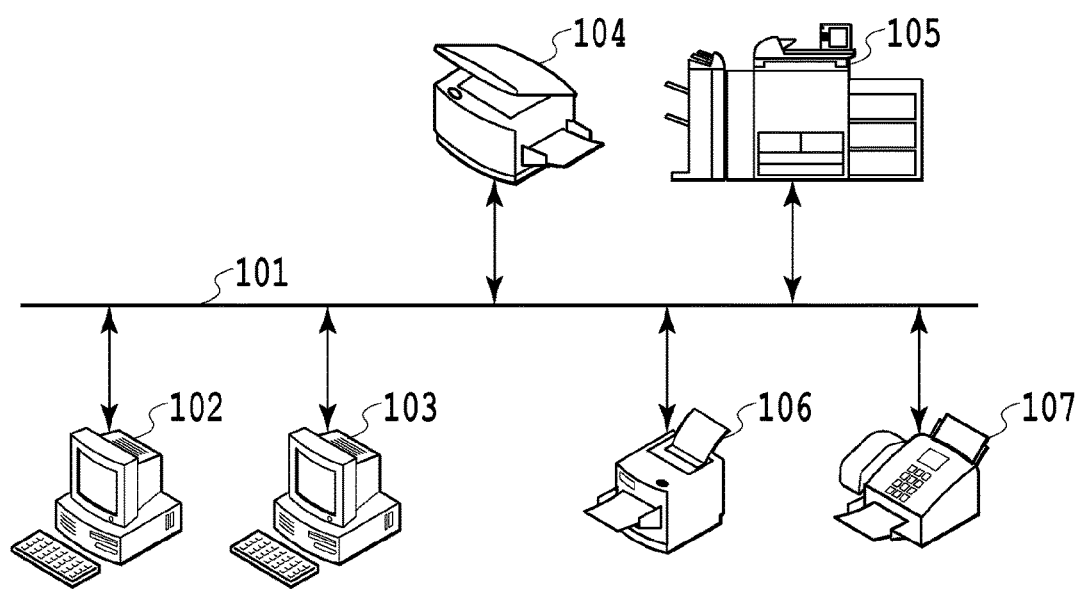
FIG. 1 is a configuration diagram of a system in Embodiment 1.

FIG. 1 is a configuration diagram of a system employed in Embodiment 1. In FIG. 1, apparatuses such as MFPs 104, 105, a printer 106, and a fax 107 are connected to a network 101. The network is described here as an Ethernet (registered trademark) network as an example. The MFPs 104, 105 are apparatuses in which the functions of a copier, a printer, a scanner, and the like are integrated. Their functions can vary such that one is capable of color printing while the other is not, and one has different print speed than the other, for example. The printer 106 and the fax 107 are single-function apparatuses. PCs 102, 103 are PCs used by users, and are capable of print operation, scan operation, and fax operation by transmitting and receiving data to and from the apparatuses connected to the network 101, such as the MFPs 104, 105, the printer 106, and the fax 107.

Next, the structure and operation of the MFP 104 will be described. In the following, the MFP 104 will be described as an information processing apparatus, and description will be given of a configuration and the like related to specification of the location of a failure inside the MFP 104. Note that this embodiment is applicable to apparatuses such as the MFP 105, the printer 106, and the fax 107 (information processing apparatuses). However, the description will be given by taking the MFP 104 as an example for the sake of simple description.

Figure 2:
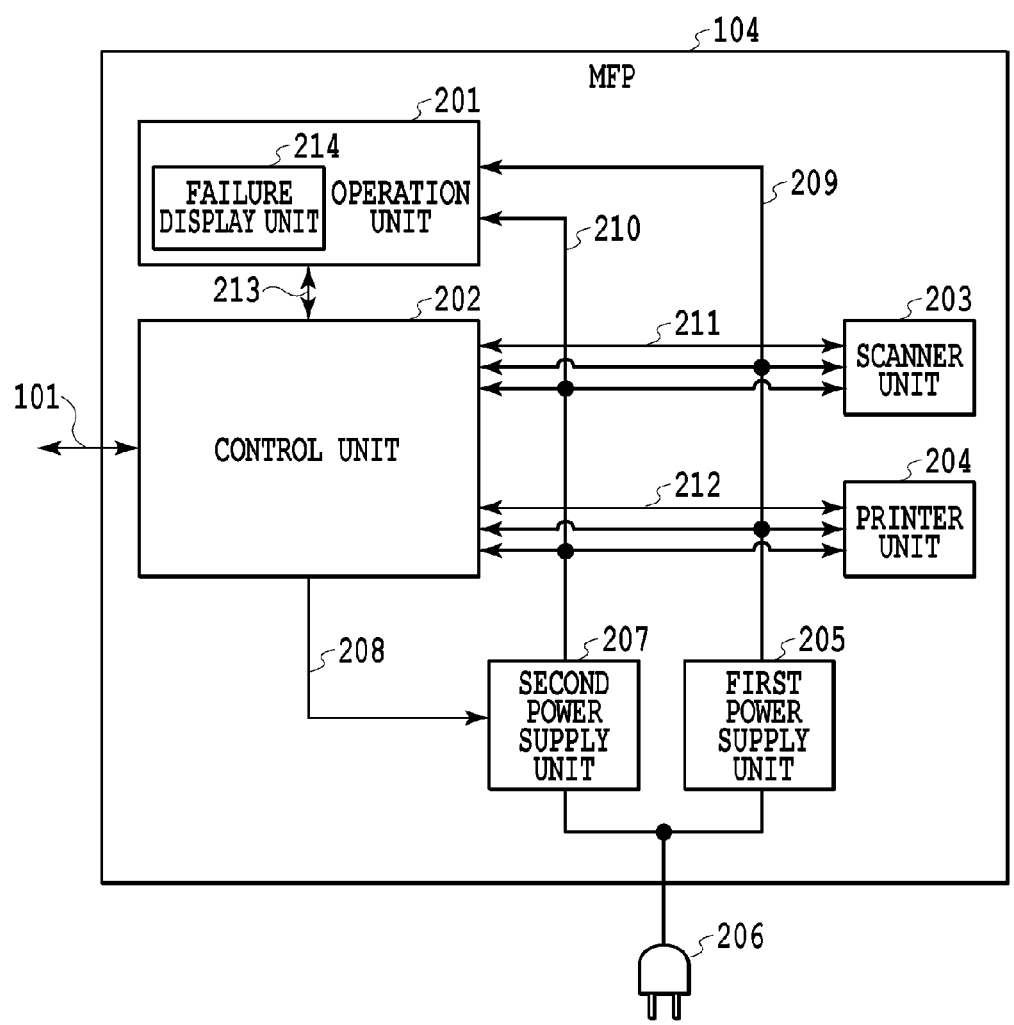
FIG. 2 is a block diagram showing the internal configuration of an MFP in Embodiment 1.

FIG. 2 is a block diagram showing the internal configuration of the MFP 104. The MFP 104 includes an operation unit 201, a control unit 202, a scanner unit 203, a printer unit 204, a first power supply unit 205, and a second power supply unit 207.

The control unit 202 is a unit configured to control the operation of the MFP 104, and performs data transmission and reception, data conversion, data storing, power control, and the like.

In print operation, first, job data is created by the PC 102, and the job data is transferred to the control unit 202 through the network 101. The control unit 202 temporarily stores the transferred job data. The control unit 202 then converts the stored job data into image data and transfers it to the printer unit 204. The printer unit 204, under control of the control unit 202, prints the image data onto recording paper and discharges the recording paper out of the apparatus.

In scan operation, first, the user places an original on the scanner unit 203. Then, seeing a window on the operation unit 201, the user operates a button(s) of the operation unit 201 to set scan operation. Thereafter, the control unit 202 instructs the scanner unit 203 to initiate the scan operation. The scanner unit 203, under control of the control unit 202, optically reads the original and converts it into image data. The image data is stored temporarily in the control unit 202 and then transferred to a destination designated by the operation unit 201 in advance.

In copy operation, first, the user places an original on the scanner unit 203. Then, seeing a window on the operation unit 201, the user operates a button(s) of the operation unit 201 to set copy operation. Thereafter, the control unit 202 instructs the scanner unit 203 to initiate the copy operation. The scanner unit 203, under control of the control unit 202, optically reads the original and converts it into image data. The image data is stored temporarily in the control unit 202 and then converted by the control unit 202 into a data format compatible with the printer unit 204. The printer unit 204 prints the image data onto recording paper and discharges the recording paper out of the apparatus.

The first power supply unit 205 and the second power supply unit 207 are power supplies configured to convert an AC commercial power fed from a power plug 206 into DC voltages to be used by units in the MFP 104. The power output of the second power supply unit 207 is controlled between on and off states by a power control signal 208 outputted from the control unit 202. In a case where the power output of the second power supply unit 207 is controlled to the on state by the power control signal 208, the power output is fed through a second power cable 210 into each of the control unit 202, the operation unit 201, the scanner unit 203, and the printer unit 204. The second power supply unit 207 is on during a normal mode and off during an energy-saving mode.

Here, the energy-saving mode refers to a state where the power feed to parts other than the control unit 202 is stopped in a case where the apparatus is not performing any job processing such as the print operation, the scan operation, or the copy operation, so as to reduce the consumption of the commercial power. During the energy-saving mode, the control unit 202 can detect receipt of a job. In response to such detection, the control unit 202 switches the power control signal 208 to turn on the second power supply unit 207 so that the mode can transition to the normal mode.

Power from the first power supply unit 205, which is outputted constantly, is fed through a first power cable 209 into a diagnosis unit (not shown in FIG. 2) in each of the control unit 202, the operation unit 201, the scanner unit 203, and the printer unit 204.

An operation-unit communication line 213 is used to output window data from the control unit 202 to the operation unit 201 and to transmit and receive commands such as data generated by operation on the buttons or touchscreen of the operation unit 201. In a similar manner, the control unit 202 transmits and receives commands and scanned image data to and from the scanner unit 203 through a scanner communication line 211, and transmits and receives commands and print image data to and from the printer unit 204 through a printer communication line 212.

The operation unit 201 includes a failure display unit 214 including a light emitting diode (LED), for example, for displaying failure diagnosis information from the control unit 202. The control unit 202 controls the on and off of the LED by using a signal line in the operation-unit communication line 213.

Figure 3:
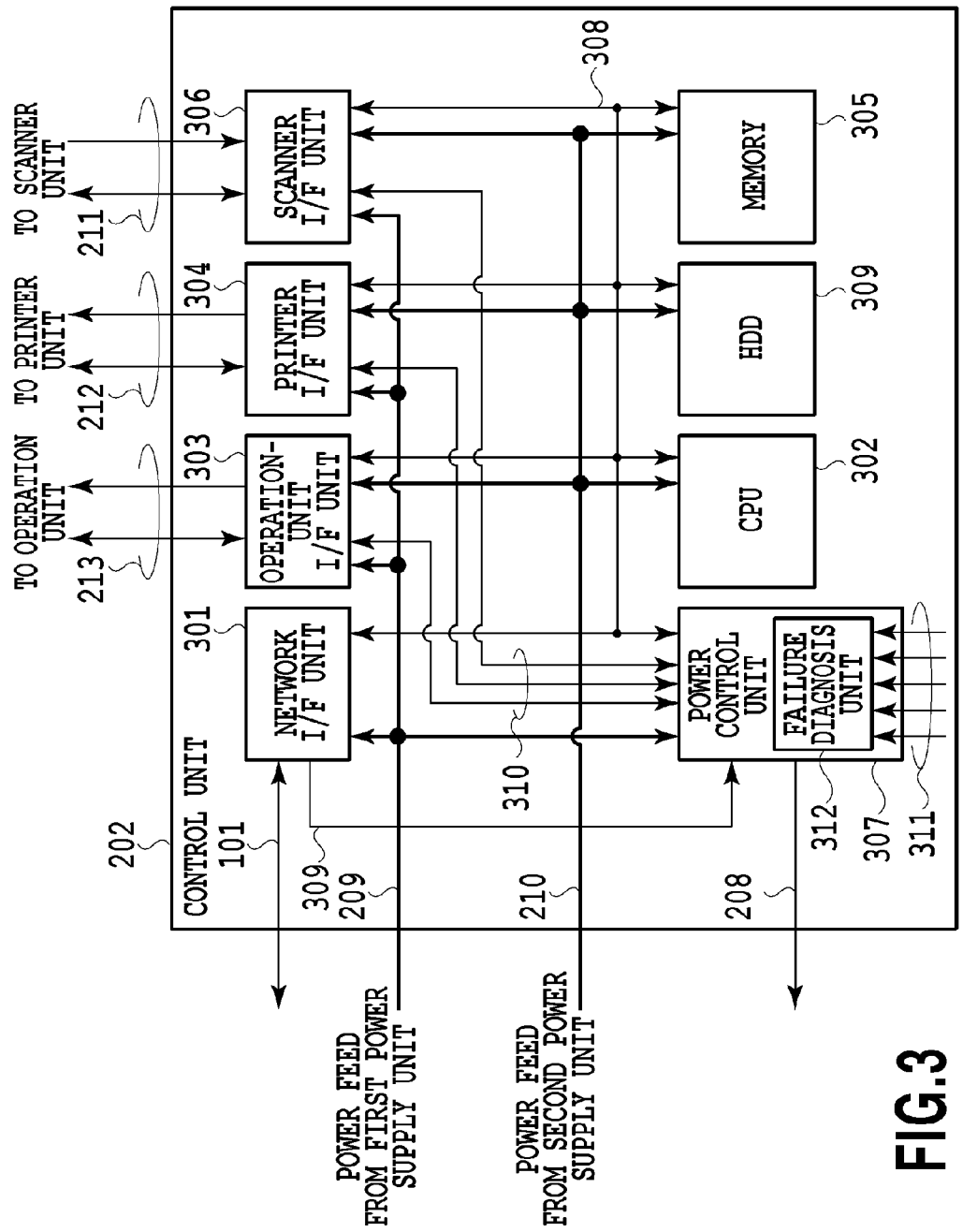
FIG. 3 is a block diagram showing the configuration of a control unit in Embodiment 1.

FIG. 3 is a block diagram showing the configuration of the control unit 202 in this embodiment. The control unit 202 includes a network I/F unit 301, a CPU 302, an operation-unit I/F unit 303, a printer I/F unit 304, a memory 305, a scanner I/F unit 306, and a power control unit 307. The power control unit 307 includes a failure diagnosis unit 312.

The CPU 302 is configured to control jobs and each unit and operates by using the memory 305 and a HDD 309 storing programs, image data, and the like. The network I/F unit 301, the operation-unit I/F unit 303, the scanner I/F unit 306, and the printer I/F unit 304 are configured to perform network communication and connected by an internal bus 308.

With power fed from the second power supply unit 207 to the CPU 302 and other elements such as the memory 305 and the HDD 309 (i.e. normal mode), the CPU 302 starts operating, reads a boot program out of the memory 305, and executes the read program to complete the boot.

In a case where the MFP 104 is in the energy-saving mode, the output of the second power supply unit 207 is turned off by the power control signal 208, which is outputted by the CPU 302. The network I/F unit 301, the operation-unit I/F unit 303, the printer I/F unit 304, the scanner I/F unit 306, and the power control unit 307, which receive power feed from the first power supply unit 205, are the units in the control unit 202 that operate in this state. One trigger to transition from the energy-saving mode to the normal mode is to receive a wake packet through the network 101. In a case where the network I/F unit 301 receives a packet, the network I/F unit 301 refers to its content, and asserts a network-return trigger signal 309 if the packet is one that requires processing such as job data.

In response to the assertion of the network-return trigger signal 309, the power control unit 307 asserts the power control signal 208. After the output of the second power supply unit 207 is turned on, the CPU 302 performs the boot process as mentioned above.

In a case where there is no job such as a print, copy, or fax job or no operation on the operation unit 201 during the normal mode, the CPU 302 performs transition to the energy-saving mode. Specifically, the CPU 302 shuts down the OS and performs a termination process on each part, and then controls the power control signal 208 to turn off the second power supply unit 207.

Operation on a button of the operation unit 201 and detection of an original on the scanner unit 203, for example, are possible factors of return from the energy-saving mode to the normal mode. Sensors of the operation unit 201 and the scanner unit 203 are fed with the power from the first power supply unit 205 and can therefore detect these actions even during the energy-saving mode. The detected actions are communicated between these units and the power control unit 307 through power control communication I/F 310.

The failure diagnosis unit 312, which is included in the power control unit 307, is configured to detect a failure and specify the location of the failure by using signals in the power control unit 307 and monitoring signals 311 in the control unit 202. The monitoring signals 311 are signals such as a power control signal, a reset signal, a clock signal, and a communication I/F signal, for example. Boot fault and CPU hang-up can be detected by monitoring whether these signals change one after another in a prescribed sequence during boot and operation. Also, by using the states of the monitoring signals at the moment of detection of an abnormal condition, the location of the failure can be narrowed to a specific location. By monitoring more signals, the location of the failure can be narrowed to a more specific location. The failure diagnosis unit 312 is also configured to generate a flash pattern in accordance with the location of the failure, and cause the LED of the failure display unit 214 in the operation unit 201 to flash through the corresponding power control communication I/F 310. In this way, the location of the failure can be notified to the serviceman, and the serviceman can utilize this flash of the LED for the work of separating the failure part.

To facilitate the understanding of this embodiment, a configuration using a communication line dedicated to diagnosis will be described below by using FIG. 4 as preliminary description of the configuration of this embodiment. Then, problems that possibly occur in the configuration using the communication line dedicated to diagnosis will be described, and thereafter the configuration of this embodiment will be described.

Figure 4:
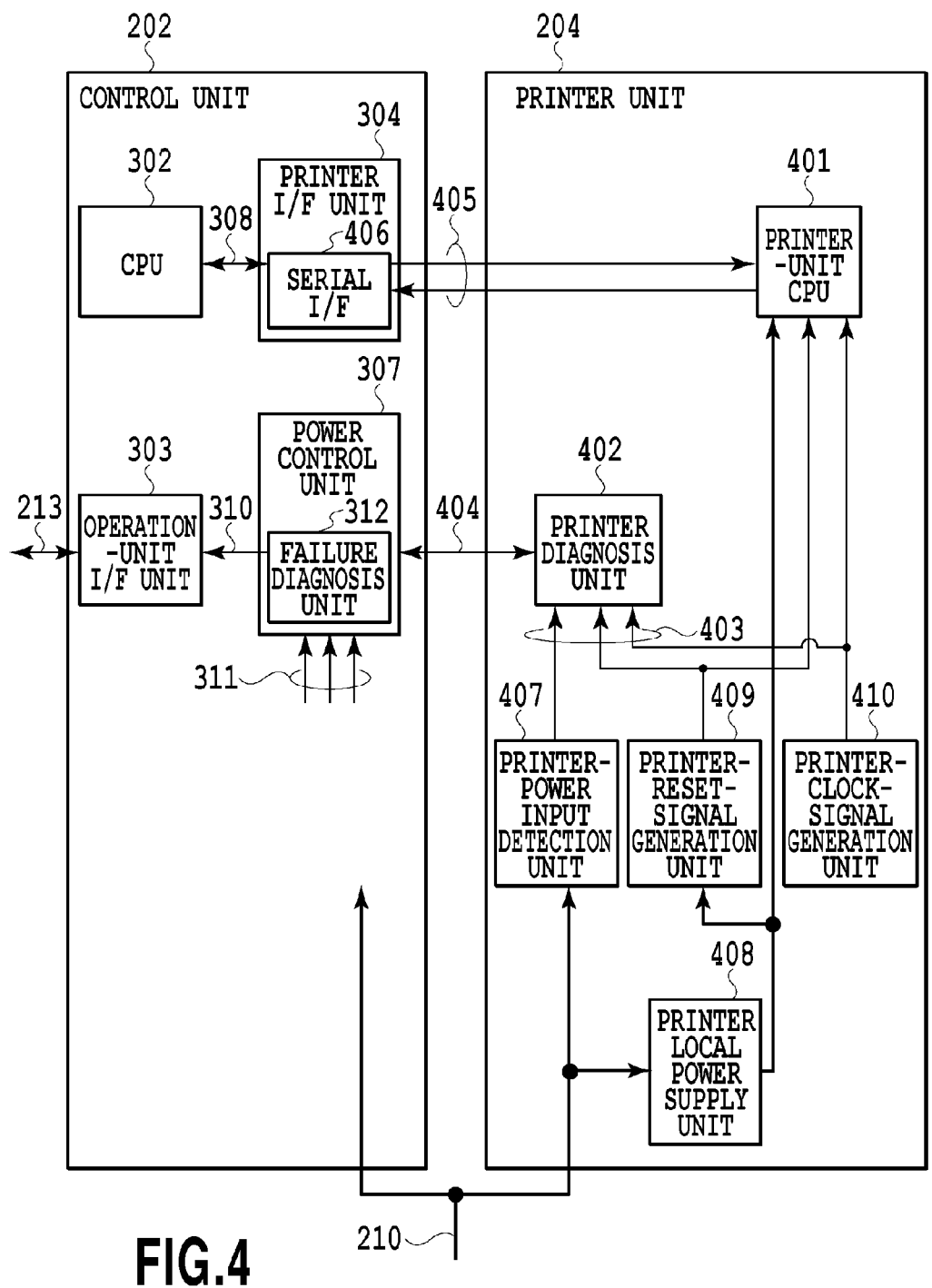
FIG. 4 is a block diagram showing the configuration of units connected by a communication line dedicated to diagnosis.

FIG. 4 is a block diagram showing communication of diagnosis information between units using the communication line dedicated to diagnosis. The CPU 302 of the control unit 202 and a printer-unit CPU 401 of the printer unit 204 perform CPU-to-CPU communication by means of a serial I/F signal 405 transferred through the printer communication line 212. The serial I/F signal 405 is converted into a signal for the internal bus 308 by a serial I/F 406 in the printer I/F unit 304 and transferred to the CPU 302.

The control unit 202 and the printer unit 204 perform their own failure diagnosis by using the respective diagnosis units provided thereto. Specifically, the failure diagnosis unit 312 in the power control unit 307 performs failure diagnosis on the control unit 202, and a printer diagnosis unit 402 performs failure diagnosis on the printer unit 204. As mentioned earlier, the failure diagnosis unit 312 performs the failure diagnosis on the control unit 202 based on the monitoring signals 311 in the control unit. The printer diagnosis unit 402 performs the failure diagnosis by using printer-unit monitoring signals 403 in the printer unit 204.

The printer-unit monitoring signals 403 used for the failure diagnosis on the inside of the printer unit 204 will be described. The printer-unit monitoring signals 403 are signals that change during boot or operation of the CPU or that change in the presence of a failure such as a power control signal, power, a reset signal, a clock signal, an interrupt signal, and a communication signal, for example. For example, in FIG. 4, the printer diagnosis unit 402 utilizes the output of a printer-power input detection unit 407 as one monitoring signal 403, the printer-power input detection unit 407 being configured to output a signal indicating whether or not the power of the second power supply unit 207 inputted into the printer unit 204 is valid. Also, the printer diagnosis unit 402 utilizes a reset signal from a printer-reset-signal generation unit 409 as one monitoring signal 403, the reset signal being a signal indicating whether or not power generated in the printer unit 204 is valid. The printer-reset-signal generation unit 409 operates by using the output of a printer-unit local power supply unit 408 configured to convert the voltage from the second power supply unit 207. Moreover, the printer diagnosis unit 402 utilizes the clock output of a printer-unit clock-signal generation unit 410 as one monitoring signal 403, the clock output indicating whether or not the clock signal is oscillating. During boot, these signals change one after another in such a sequence that the power input into the printer unit 204 changes, the clock signal starts oscillating, and then the reset is released. A failure can be detected based on whether or not one of these changes to another occurs within a prescribed time. For example, the method includes: starting measuring time upon the input of the power from the second power supply unit 207; and determining whether or the clock signal starts oscillating within 100 milliseconds after the power input. The failure detection method described here is applied similar to the failure diagnosis unit 312 and the monitoring signals 311 in the control unit 202. Also, the other units, such as the operation unit 201 and the scanner unit 203, may also perform failure detection in a similar manner.

In FIG. 4, a diagnosis-information communication line 404 is provided between the power control unit 307 and the printer diagnosis unit 402. In a case where a failure occurs, the information of the monitoring signals 403 can be transferred from the printer diagnosis unit 402 to the power control unit 307 through the diagnosis-information communication line 404. With this configuration, the power control unit 307 can obtain diagnosis information on the inside of the printer unit 204 more accurately from a narrower range.

However, in the example described with reference to FIG. 4, the dedicated line is used for the communication between the diagnosis units. This increases the cost. In addition, there are possibilities of disconnection, loose connection of connectors, and/or forgetting to insert the connectors. Thus, the presence of the diagnosis-information communication line 404 itself can be a cause of a failure and therefore has the disadvantage that it might decrease the reliability.

This embodiment will describe an example where the printer diagnosis unit 402, included in the printer unit 204, and the power control unit 307, configured to perform failure diagnosis on the inside of the control unit 202, communicate diagnosis information therebetween by utilizing the serial I/F signal 405 in the printer communication line 212. Specifically, FIG. 4 has shown the example where the diagnosis information is communicated through the line dedicated to the diagnosis information; in this embodiment, however, the diagnosis information is communicated by means of the existing serial I/F signal 405, which is used for data exchange.

A universal asynchronous receiver transmitter (UART) with a simple protocol is used for the serial I/F communication in this embodiment. The UART performs one-to-one communication, and information exchanged contains no sender or destination information. Then, to perform the communication between the CPUs and the communication between the diagnosis units by using the same line, processing is performed which at least involves switching to the signal to be outputted from a sub diagnosis unit configured to transmit diagnosis information to a main diagnosis unit. In this embodiment, the main diagnosis unit is the diagnosis unit included in the unit configured to cause the failure display unit 214 of the operation unit 201 to display information with its LED as mentioned earlier, namely, the power control unit 307 (failure diagnosis unit 312) in the control unit 202. The sub diagnosis unit is the printer diagnosis unit 402 in the printer unit 204, for example. In this embodiment, during the normal state, the signal to be transmitted from the sub diagnosis unit to the main diagnosis unit is switched from such that CPU-to-CPU communication is performed. In a case where a failure occurs, the signal to be transmitted from the sub diagnosis unit to the main diagnosis unit is switched to such that it is communicated between the diagnosis units and the CPU-to-CPU communication is not performed.

Figure 5:
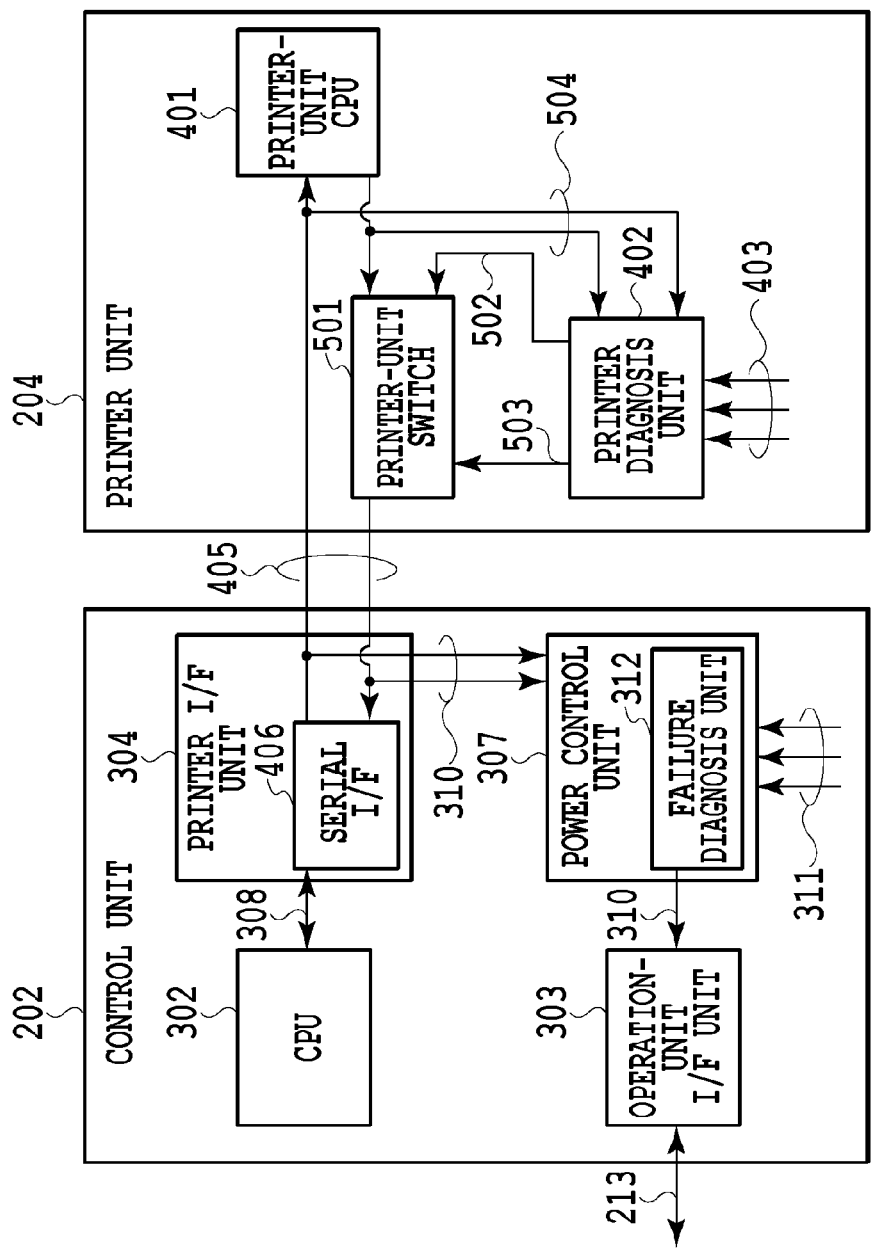
FIG. 5 is a block diagram showing communication of diagnosis information between units in Embodiment 1.

FIG. 5 is a block diagram showing communication of diagnosis information between units in Embodiment 1. The printer unit 204 includes a printer-unit switch 501 configured to switch the serial I/F signal 405 to be transmitted from the printer unit 204 to the control unit 202 between one to the printer-unit CPU 401 and one to the printer diagnosis unit 402.

The printer diagnosis unit 402 receives CPU-to-CPU serial I/F signals 504 and can monitor the output of the CPU 302 and the output of the printer-unit CPU 401. In this way, the printer diagnosis unit 402 can determine whether or not the CPU-to-CPU communication is being performed properly. In the CPU-to-CPU communication, existence confirmation is performed at an interval of 30 seconds, for example, even if there is no actual data exchange. Specifically, the control unit 202 transmits a response request command to the printer unit 204, and the printer unit 204 transmits a response to the response request command to the control unit 202, so that its existence is confirmed. In this way, the printer diagnosis unit 402 can determine whether or not the CPU-to-CPU communication is performed properly.

The printer-unit switch 501 receives a signal transmitted from the printer-unit CPU 401 toward the CPU 302 in the control unit 202, and a signal transmitted from the printer diagnosis unit 402 toward the failure diagnosis unit 312 in the control unit 202. The printer-unit switch 501 switches the signal to be outputted therefrom in accordance with a printer-unit switch signal 503 outputted from the printer diagnosis unit 402. Specifically, the printer-unit switch 501 selectively outputs to the control unit 202 one of the signal transmitted from the printer-unit CPU 401 toward the CPU 302 in the control unit 202 and the signal transmitted from the printer diagnosis unit 402 toward the failure diagnosis unit 312 in the control unit 202. In a case where the printer diagnosis unit 402 determines that a failure has occurred, the printer diagnosis unit 402 changes the printer-unit switch signal 503 to thereby switch the printer-unit switch 501 from the printer-unit CPU side for normal state to the printer-diagnosis-unit side for failure state. Thereafter, the printer diagnosis unit 402 transmits to the control unit 202 a printer-diagnosis-unit signal 502 with the information of the printer-unit monitoring signals 403 in the data format for the UART.

Meanwhile, the serial I/F signal 405 inputted into the printer I/F unit 304 in the control unit 202 is branched into a signal for the serial I/F 406 to be inputted into the CPU 302 and a signal for the power control communication I/F 310 to be inputted into the power control unit 307. Also, the signal to be outputted from the printer I/F unit 304 is branched into a signal for the printer unit 204 and a signal for the power control communication I/F 310. The power control unit 307 uses each signal from the power control communication I/F 310 as information indicating the monitored state of the serial I/F communication, until a point to be described later where it is determined that a failure has occurred. After it is determined that a failure has occurred, the power control unit 307 uses the signal from the power control communication I/F 310 as diagnosis information from the printer diagnosis unit 402. In sum, in this embodiment, the control unit 202 does not perform switching actions like the printer-unit switch 501 and changes how to handle the received information based on whether or not the power control unit 307 determines that a failure has occurred. After the power control unit 307 determines that a failure has occurred, the information inputted into the power control unit 307 by means of the serial I/F signal 405 is used as diagnosis information from the printer unit 204 to specify the location of the failure. In addition to this diagnosis information from the printer unit 204, the failure diagnosis unit 312 can use the information of internal signals in the power control unit 307 and the inputted monitoring signals 311 to specify the location of the failure.

With the above configuration, in a case of a failure, the failure diagnosis unit 312 can obtain diagnosis information from outside the control unit 202 by utilizing the existing signals used for the CPU-to-CPU communication during the normal state. In FIG. 5, the control unit 202 and the printer unit 204 are described as example processing units. However, the failure diagnosis unit 312 can obtain diagnosis information from the other units (processing units), such as the operation unit 201 and the scanner unit 203, by using a similar configuration as long as these processing units include diagnosis units as described above. Since the failure diagnosis unit 312 of the control unit can obtain diagnosis information from outside in addition to the monitoring signals 311 in the control unit, the location of a failure can be specified more accurately from a narrower range.

Figure 6:
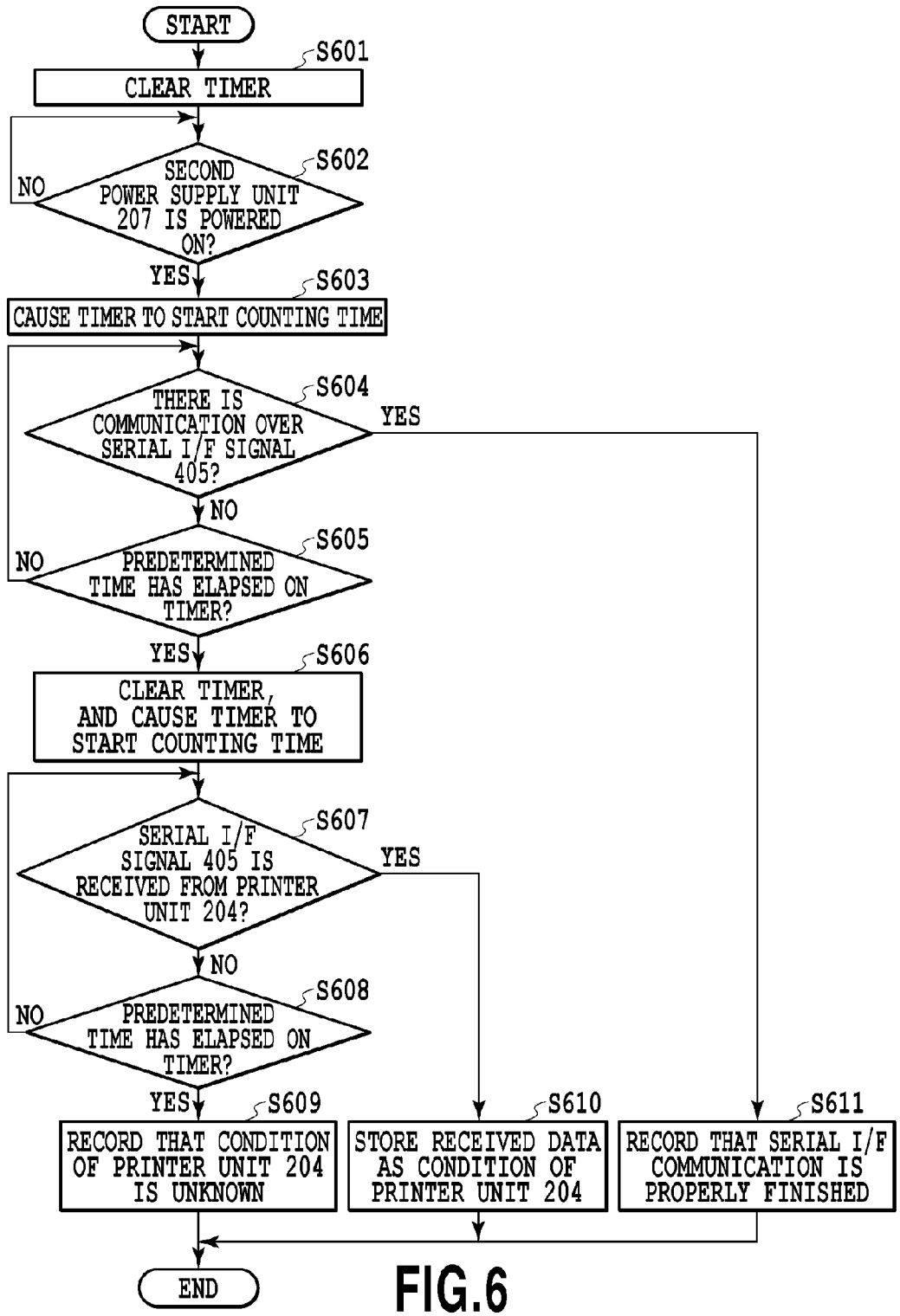
FIG. 6 is a flowchart of processing performed by a failure diagnosis unit in a case where a failure occurs in Embodiment 1.

FIG. 6 is a flowchart of processing preformed by the failure diagnosis unit 312 in the control unit 202 in Embodiment 1.

In Step S601, the failure diagnosis unit 312 clears a timer in the failure diagnosis unit 312. In Step S602, the failure diagnosis unit 312 waits until the second power supply unit 207 is turned on. In Step S603, after the second power supply unit 207 is turned on, the failure diagnosis unit 312 causes the timer to start counting time. Here, in the example shown, the trigger to start counting time is the turning on of the second power supply unit 207, but the trigger may be a signal requesting initiation of communication or the like. That is, any signal can be used as a trigger to start the timer as long as it changes simultaneously at both the control unit 202 and the printer unit 204. Note that the failure diagnosis unit 312 is capable of detecting that the second power supply unit 207 is turned on, by means of the monitoring signals 311.

In Step S604, the failure diagnosis unit 312 monitors whether or not there is CPU-to-CPU communication over the serial I/F signal 405. If there is communication, the failure diagnosis unit 312 proceeds to Step S611, in which the failure diagnosis unit 312 records therein that the communication between the control unit 202 and the printer unit 204 is properly finished, and ends the process.

If there is no communication in Step S604, the failure diagnosis unit 312 proceeds to Step S605, in which the failure diagnosis unit 312 determines whether or not a predetermined time (e.g. one minute) has elapsed on the timer. If the predetermined time has not yet elapsed, the failure diagnosis unit 312 continues the process from Step S604 again. If no communication has been performed for the predetermined time (if the predetermined time has elapsed), the failure diagnosis unit 312 determines that the communication between the control unit 202 and the printer unit 204 has not been performed properly and that a failure has occurred. The failure diagnosis unit 312 then proceeds to Step S606. As mentioned earlier, in the CPU-to-CPU communication between the control unit 202 and the printer unit 204, the existence confirmation signal is exchanged at an interval of 30 seconds. Thus, if there is no communication over the serial I/F signal 405 (the signal remains unchanged) while one minute elapses on the timer, for example, the failure diagnosis unit 312 can determine that the communication between the control unit 202 and the printer unit 204 has not been performed properly.

Then in Step S606, the failure diagnosis unit 312 clears the timer in the failure diagnosis unit 312 and causes it to start counting time again to thereby wait for a predetermined time to receive diagnosis information from the printer unit 204. As will be described later, the failure diagnosis unit 312 determines that a failure has occurred, at the same timing as the timing when the printer diagnosis unit 402 determines that a failure has occurred. Since the printer diagnosis unit 402 transmits diagnosis information as the serial I/F signal 405 after determining that a failure has occurred, the failure diagnosis unit 312 clears the timer and causes it to start counting time so that the failure diagnosis unit 312 can wait to receive this diagnosis information.

Then in Step S607, the failure diagnosis unit 312 determines whether or not the serial I/F signal 405 has been received from the printer unit 204. If the serial I/F signal 405 has been received, the failure diagnosis unit 312 proceeds to Step S610, in which the failure diagnosis unit 312 stores the received data as diagnosis information indicating the failure condition of the printer unit 204, and ends the process. If the serial I/F signal 405 has not been received, the failure diagnosis unit 312 proceeds to Step S608, in which the failure diagnosis unit 312 determines whether or not the predetermined time (e.g. one minute) has elapsed on the timer. The failure diagnosis unit 312 iterates the process from Step S607 until the predetermined time elapses on the timer. If the predetermined time has elapsed, it means that the control unit 202 has failed to properly perform the CPU-to-CPU communication with the printer unit 204 and obtain the diagnosis information from the printer unit 204. Thus, the failure diagnosis unit 312 proceeds to Step S609, in which the failure diagnosis unit 312 records that the condition of the printer unit 204 is unknown, and ends the process. Step S609 represents a situation where the printer diagnosis unit 402 has not been powered on or the serial I/F signal 405 has been disconnected, for example.

Figure 7:
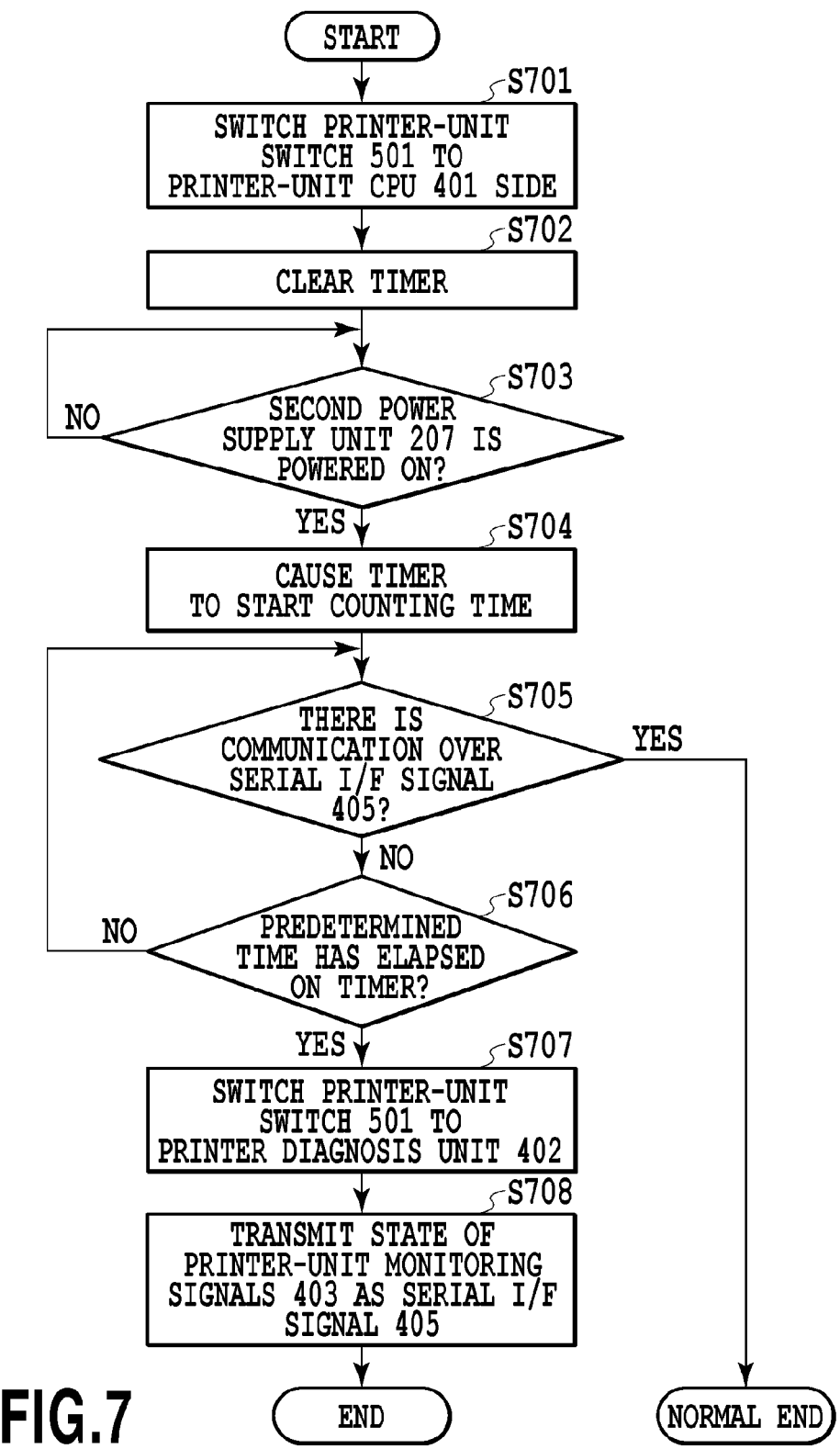
FIG. 7 is a flowchart of processing performed by a printer diagnosis unit in a case where a failure occurs in Embodiment 1.

FIG. 7 is a flowchart of processing performed by the printer diagnosis unit 402 in a case where a failure occurs in Embodiment 1.

In the initial state, in Step S701, the printer diagnosis unit 402 changes the printer-unit switch signal 503 to switch the printer-unit switch 501 to the printer-unit CPU 401 side so that the printer-unit CPU 401 can communicate with the CPU 302.

In Step S702, the printer diagnosis unit 402 clears a timer in the printer diagnosis unit 402. Then in Step S703, the printer diagnosis unit 402 determines whether or not the second power supply unit 207 has been turned on. If determining that the second power supply unit 207 has been turned on, the printer diagnosis unit 402 causes the timer to start counting time in Step S704. This timer is used to monitor whether or not a predetermined time has elapsed, to determine whether or not communication over the serial I/F signal 405 has been performed properly. Here, in the example shown, the trigger to start counting time is the turning on of the second power supply unit 207, but the trigger may be a signal requesting initiation of communication or the like. Any signal can be used as a trigger to start the timer as long as it changes simultaneously at both the control unit 202 and the printer unit 204. Note that the printer diagnosis unit 402 is capable of determining whether or not the second power supply unit 207 has been turned on, by means of the monitoring signals 403.

In Step S705, the printer diagnosis unit 402 determines whether or not there has been communication over the serial I/F signal 405. If there has been communication, the printer diagnosis unit 402 determines that the CPU-to-CPU communication between the CPU 302 of the control unit 202 and the printer-unit CPU 401 has been properly initiated, and ends the process. If there has not been communication, the printer diagnosis unit 402 proceeds to Step S706, in which the printer diagnosis unit 402 determines whether or not the predetermined time (e.g. one minute) has elapsed on the timer. If the predetermined time has not yet elapsed, the printer diagnosis unit 402 returns to Step S705 and continues the loop process. If the predetermined time has elapsed, the printer diagnosis unit 402 determines that a failure disabling initiation of the CPU-to-CPU communication has occurred. The printer diagnosis unit 402 then performs operation for notifying this condition of the printer unit 204 to the failure diagnosis unit 312.

In Step S707, the printer diagnosis unit 402 switches the printer-unit switch 501 to the printer diagnosis unit 402 side. Then in Step S708, the printer diagnosis unit 402 transmits diagnosis information indicated by the printer-unit monitoring signals 403. This diagnosis information is transmitted as the serial I/F signal 405 to the control unit 202. This transmitted diagnosis information is received by the failure diagnosis unit 312 in the control unit 202 in Step S607 in the flowchart described with reference to FIG. 6.

With the flow described above, the failure diagnosis unit 312 can detect whether or not communication with the printer unit 204 is successful, and can check the condition of the printer unit 204 based on diagnosis information from the printer unit 204 in a case where a failure occurs. A similar flow can be used for communication with the other units, such as the operation unit 201 and the scanner unit 203. Further, the failure diagnosis unit 312 can also detect a failure by monitoring the monitoring signals 311 in the control unit 202. In a case where one or more abnormalities are detected by any of the failure detection operations, the failure diagnosis unit 312 displays the failures on the failure display unit 214. Note that the failure diagnosis unit 312 is capable of specifying the locations of the failures based on the information obtained. One specification method is, for example, to refer to a table that allows determination of the location of a failure based on combination of the states of the monitor target signals and the condition of the monitor target unit.

TABLE 1

Failure-Location Determination Table

| Internal Signal A | Monitoring Signal B | Condition of Printer Unit 204 | Failure Display Signal 214 | Content of Failure |
|---|---|---|---|---|
| Active | Inactive | Don't Care | Flash Pattern 1 | Failure in Control Unit 202 |
| Active | Active | Power Fault in Printer Unit | Flash Pattern 2 | Failure in Printer Unit 204 |
| Active | Active | CPU Boot Fault | Flash Pattern 2 | Failure in Printer Unit 204 |
| Active | Active | Communication Failure | Flash Pattern 2 | Failure in Printer Unit 204 |
| | | Other Than Above | Off | Normal |

Table 1 is an example of a table for determining the locations of failures. In Table 1, "Internal Signal A" represents the signals inside the failure diagnosis unit 312; "Monitoring Signal B" represents the monitoring signals 311, which are inputted into the failure diagnosis unit 312 in the control unit 202; and "Condition of Printer Unit 204" represents diagnosis information on the printer unit 204 received from the printer diagnosis unit 402 of the printer unit 204 as the serial I/F signal 405 after the failure diagnosis unit 312 determines that a failure has occurred. Since the diagnosis information on the printer unit 204 can be obtained, the location of the failure can be specified from a narrower range as compared to a case where there are only "Internal Signal A" and "Monitoring Signal B." For example, it is possible to specify that the printer unit 204 cannot be powered on (a power supply below a prescribed voltage is present in the printer unit due to a failure in its power circuit) or that the CPU of the printer unit 204 cannot be booted (e.g. the CPU has a failure or programs are not properly written thereonto). Through the operation-unit communication line 213, the failure diagnosis unit 312 causes the failure display unit 214 in the operation unit 201 to flash in a flash pattern obtained from the failure-location determination table.

As described above, the failure diagnosis unit 312 is capable of monitoring the communication with the printer unit 204 and detecting whether or not a failure has occurred. Moreover, in a case where a failure occurs, the existing serial I/F signal 405 for performing the CPU-to-CPU communication during the normal state is utilized to receive diagnosis information from the printer unit 204, and thereby allows detailed specification of the location of the failure or the cause of the failure. Thus, a diagnosis content corresponding to the specification of the location can be displayed. In this way, the serviceman, for example, can figure out the location, cause, or the like of a failure more accurately from a narrower range. Note that this embodiment has been described by taking the example where the location of a failure is displayed by means of an LED to notify the location of the failure to the user; however, it is possible to employ a method in which the location of the failure is displayed on a display or notified by means of sound or the like.

As described above, in this embodiment, failure diagnosis involving a plurality of units is performed by using an existing signal that is used during a normal state, instead of using a dedicated line. Hence, it is possible to prevent the increase in cost and the decrease in reliability due to addition of a mechanism for failure diagnosis.

Embodiment 2

In Embodiment 1, the description has been given of the example where the printer-unit switch 501 is provided to the printer unit 204. In Embodiment 2, description will be given of an example where a switch is additionally provided to the control unit 202 in the configuration in Embodiment 1. Specifically, in Embodiment 2, description will be given of an example where both the control unit 202 and the printer unit 204 include switches for switching the serial I/F signal 405 on the transmitting side and the receiving side of the serial I/F signal 405.

Embodiment 1 has the advantage that the configuration is simple since only the part of the serial I/F signal 405 transmitted from the printer unit 204 to the control unit 202 is switched. To put it differently, however, the CPU 302 and the printer-unit CPU 401 can receive the serial I/F signal 405 even in a case where a failure occurs. Then, even in a case where the serial I/F signal 405 is not communicated properly, the CPU 302 might receive diagnosis information transmitted by the printer diagnosis unit 402 and the CPU 302 might perform unwanted operation. This embodiment is suitable for cases where the above situation occurs. Description will be given of a configuration where the serial I/F signal 405 is disconnected from both CPUs in a case where a failure occurs.

Figure 8:
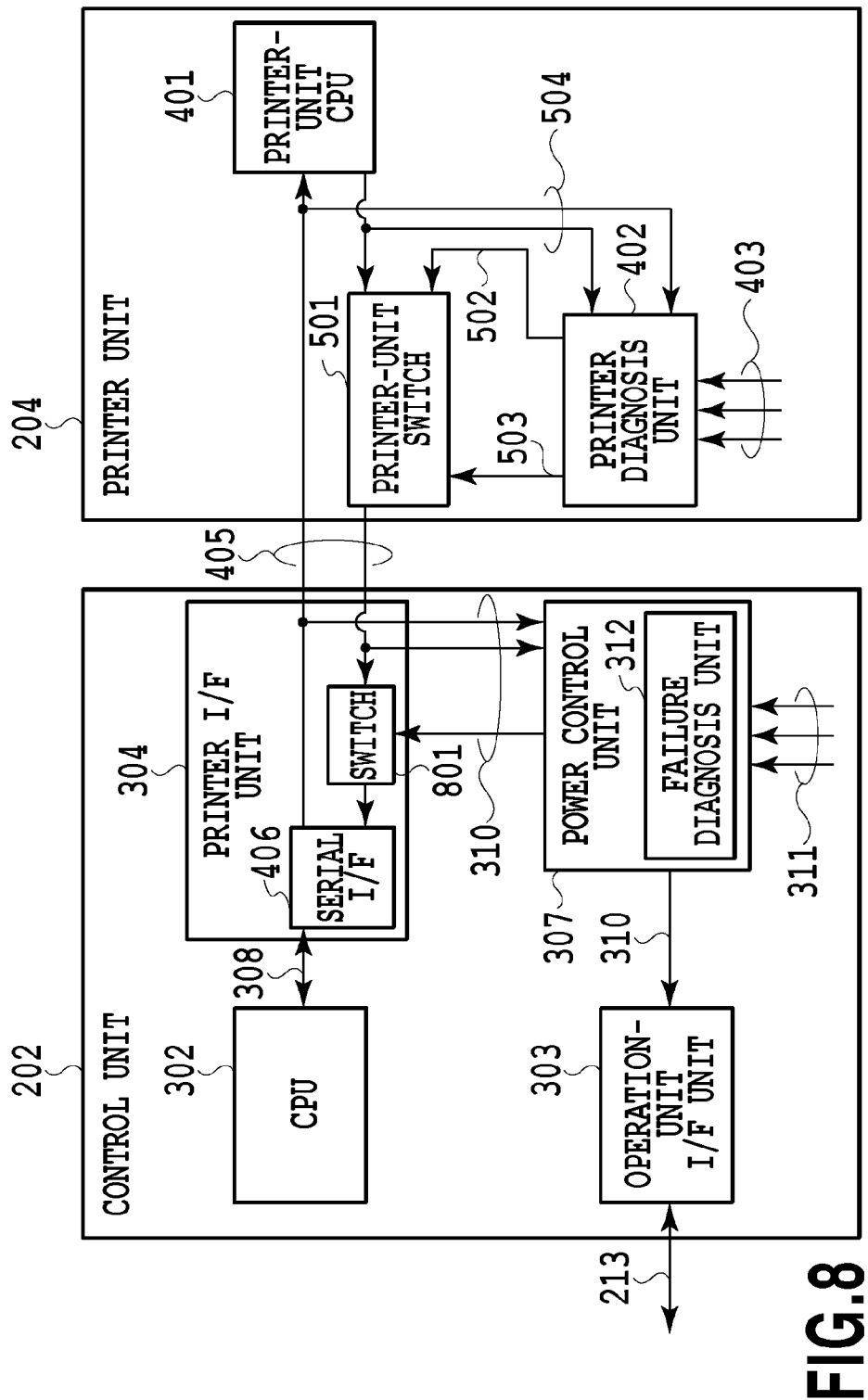
FIG. 8 is a block diagram showing communication of diagnosis information between units in Embodiment 2.

FIG. 8 is a block diagram showing communication of diagnosis information between units in Embodiment 2. The block diagram in FIG. 8 differs from the block diagram in Embodiment 1 described with reference to FIG. 5 in that a switch 801 is added in the printer I/F unit 304, the switch 801 being configured to enable or disable transfer of the serial I/F signal 405 from the printer unit 204 to the serial I/F 406. The block diagram in FIG. 8 also differs in that the failure diagnosis unit 312 can control the on and off of the switch 801. In the initial state, the switch 801 is an on state, thereby enabling the CPU 302 to receive data from the printer unit 204. In a case where the failure diagnosis unit 312 determines that a failure has occurred, the switch 801 is switched to an off state, thereby disabling the CPU 302 from receiving data from the printer unit 204.

Figure 9:
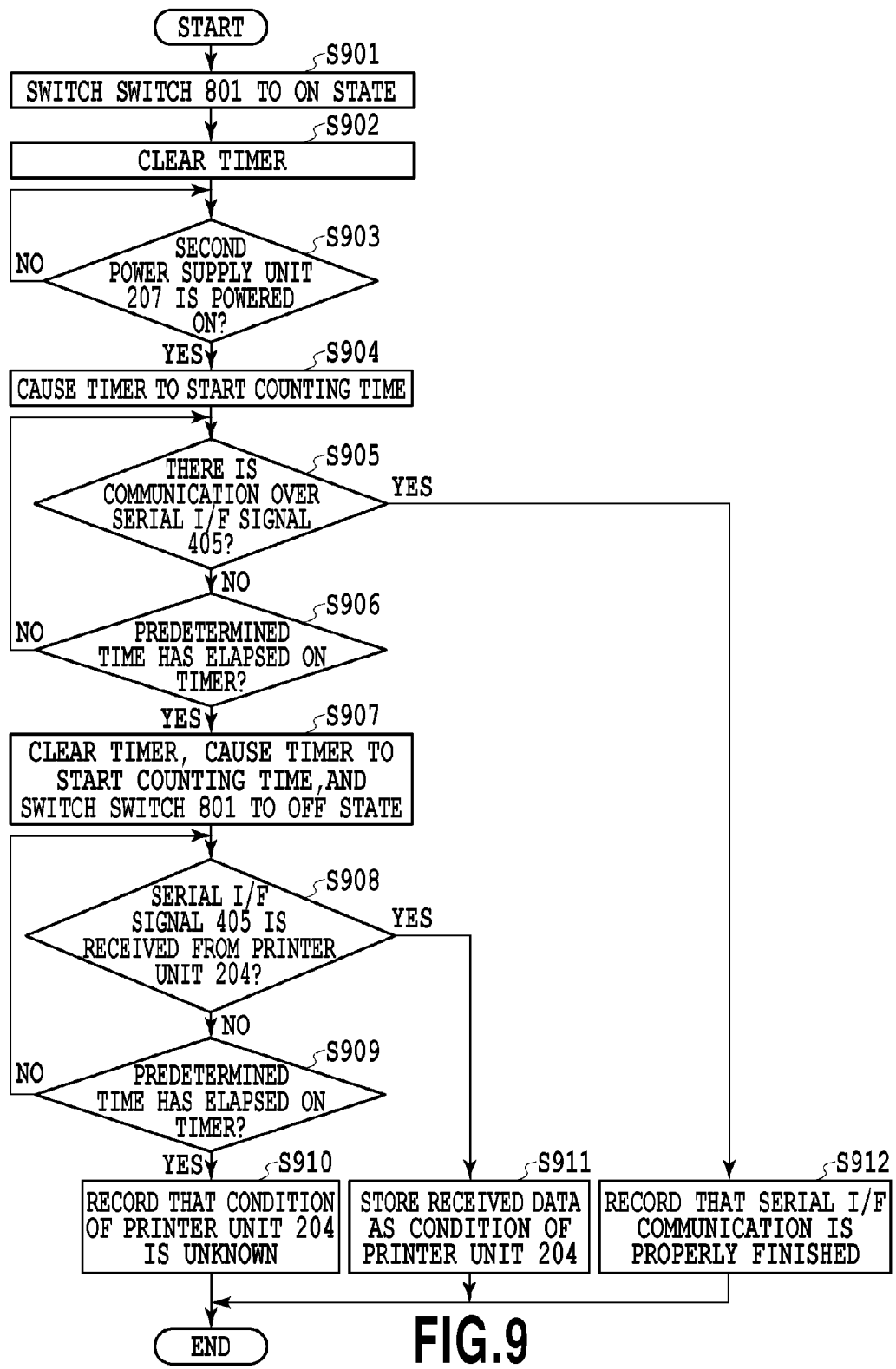
FIG. 9 is a flowchart of processing performed by a failure diagnosis unit in a case where a failure occurs in Embodiment 2.

FIG. 9 is a flowchart of processing performed by the failure diagnosis unit 312 in a case where a failure occurs in Embodiment 2. The flow in FIG. 9 differs from the flow performed by the failure diagnosis unit 312 in Embodiment 1, which has been described with reference to FIG. 6, in that on-off control of the switch 801 is added. Specifically, operation of switching the switch 801 in the initial state to the on state in Step S901 is added, and operation of switching the switch 801 to the off state in Step S907 after detection of a failure is added. The other parts of the flow are similar to those described in Embodiment 1, and therefore description thereof will be omitted.

As described above, in Embodiment 2, in a case where a failure is detected, the switch 801 is turned off so that diagnosis information cannot be inputted into the CPU 302. In this way, it is possible to eliminate the possibility of the CPU 302 performing unwanted operation due to the diagnosis information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, diagnosis information can be transferred with a simple configuration that utilizes an existing communication line. Thus, even in a case where the CPU cannot be properly booted, for example, the location of the failure can be specified from a narrower range by detecting the failure and diagnosing the condition including that of the other unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-111575, filed Jun. 1, 2015, which is hereby incorporated by reference wherein in its entirety.

What is claimed is:

1. An information processing apparatus including a first processing unit and a second processing unit, the information processing apparatus comprising:
a first diagnosis controller that detects that communication of an existence confirmation signal through a communication line is not performed properly, the communication of the existence confirmation signal being performed between a first CPU in the first processing unit and a second CPU in the second processing unit which is controlled by the first processing unit, and the first diagnosis controller being included in the first processing unit; and
an output signal switch that switches, without a user operation, information to be transmitted through the communication line from the existence confirmation signal, for CPU to CPU communication, to diagnosis information about a failure occurring in the second processing unit, in a case where it is detected that the communication of the existence confirmation signal through the communication line is not performed properly,
wherein, the output signal switch is included in the second processing unit,
the existence confirmation signal is transmitted through the communication line by the CPU to CPU communication, which is a communication from the second CPU included in the second processing unit to the first CPU included in the first processing unit,
the diagnosis information is transmitted through the communication line without the CPU to CPU communication, the diagnosis information being transmitted from a second diagnosis controller included in the second processing unit to the first diagnosis controller included in the first processing unit, and
the first diagnosis controller disables the first CPU from receiving the diagnosis information in a case where the first diagnosis controller detects the failure.

2. The information processing apparatus according to claim 1, wherein the diagnosis information is obtained by the second diagnosis controller in the second processing unit based on a monitoring signal in the second processing unit.

3. The information processing apparatus according to claim 2, wherein the first processing unit further includes a notification unit configured to notify the cause of the failure specified by the first diagnosis controller in the first processing unit.

4. The information processing apparatus according to claim 1, wherein the first diagnosis controller in the first processing unit specifies a cause of the failure based on a monitoring signal in the first processing unit and the diagnosis information.

5. The information processing apparatus according to claim 1, wherein
the first diagnosis controller in the first processing unit detects that the communication of the existence confirmation signal through the communication line is not performed properly based on a monitoring signal in the first processing unit; and the second diagnosis controller in the second processing unit detects that the communication of the existence confirmation signal through the communication line is not performed properly based on a monitoring signal in the second processing unit and, in accordance with the detection result of the second diagnosis controller in the second processing unit, the output signal switch switches the information to be transmitted through the communication line between the existence confirmation signal and the diagnosis information.

6. The information processing apparatus according to claim 5, wherein the first diagnosis controller in the first processing unit and the second diagnosis controller in the second processing unit determine that the communication of the existence confirmation signal through the communication line is not performed properly, in a case where the communication of the existence confirmation signal is not performed for a predetermined time.

7. The information processing apparatus according to claim 6, wherein the first diagnosis controller in the first processing unit and the second diagnosis controller in the second processing unit start counting the predetermined time in response to a trigger that is a signal that changes simultaneously at the first processing unit and the second processing unit.

8. The information processing apparatus according to claim 7, wherein the signal that changes simultaneously is a signal that detects that a power supply is turned on.

9. The information processing apparatus according to claim 6, wherein the first diagnosis controller in the first processing unit and the second diagnosis controller in the second processing unit determine that the communication of the existence confirmation signal through the communication line is not performed properly, in a case where the signal through the communication line remains unchanged.

10. The information processing apparatus according to claim 1, wherein the output signal switch switches the information to be transmitted through the communication line between information from the second CPU and information from the second diagnosis controller in the second processing unit, the information to be transmitted through the communication line being switched to the information from the second CPU in a case where the communication of the existence confirmation signal through the communication line is performed properly.

11. The information processing apparatus according to claim 1, wherein the first processing unit further includes a switch that switches an output destination of the information obtained from the second processing unit through the communication line, from the first CPU to the first diagnosis controller in the first processing unit, in a case where the communication of the existence confirmation signal through the communication line is not performed properly.

12. The information processing apparatus according to claim 1, wherein the communication line is alternatively used for the CPU to CPU communication and communication about a diagnosis of the second processing unit.

13. The information processing apparatus according to claim 1, wherein the existence confirmation signal for CPU to CPU communication and the diagnosis information about the failure occurring in the second processing unit are communicated using a universal asynchronous receiver transmitter (UART).

14. A method of controlling an information processing apparatus including a first processing unit and a second processing unit, the method comprising:

detecting, by a first diagnosis controller included in the first processing unit, that communication of an existence confirmation signal through a communication line is not performed properly, the communication of the existence confirmation signal being performed between a first CPU in the first processing unit and a second CPU in the second processing unit that is controlled by the first processing unit;

switching, by an output signal switch included in the second processing unit, without a user operation, information to be transmitted through the communication line from the existence confirmation signal, for CPU to CPU communication, to diagnosis information about a failure occurring in the second processing unit, in a case where it is detected that the communication of the existence confirmation signal through the communication line is not performed properly, and disabling, by the first diagnosis controller, the first CPU from receiving the diagnosis information in a case where the first diagnosis controller detects the failure, wherein the existence confirmation signal is transmitted through the communication line by the CPU to CPU communication, which is a communication from the second CPU included in the second processing unit to the first CPU included in the first processing unit, and the diagnosis information is transmitted through the communication line without the CPU to CPU communication, the diagnosis information being transmitted from a second diagnosis controller included in the second processing unit to the first diagnosis controller included in the first processing unit.

15. A non-transitory computer readable storage medium storing a program which causes a computer to perform a method of controlling an information processing apparatus including a first processing unit and a second processing unit, the method comprising:

detecting, by a first diagnosis controller included in the first processing unit, that communication of an existence confirmation signal through a communication line is not performed properly, the communication of the existence confirmation signal being performed between a first CPU in the first processing unit and a second CPU in the second processing unit that is controlled by the first processing unit;

switching, by an output signal switch included in the second processing unit, without a user operation, information to be transmitted through the communication line from the existence confirmation signal, for CPU to CPU communication, to diagnosis information about a failure occurring in the second processing unit, in a case where it is detected that the communication of the existence confirmation signal through the communication line is not performed properly, and disabling, by the first diagnosis controller, the first CPU from receiving the diagnosis information in a case where the first diagnosis controller detects the failure, wherein the existence confirmation signal is transmitted through the communication line by the CPU to CPU communication, which is a communication from the second CPU included in the second processing unit to the first CPU included in the first processing unit, and the diagnosis information is transmitted through the communication line without the CPU to CPU communication, the diagnosis information being transmitted from a second diagnosis controller included in the second processing unit to the first diagnosis controller included in the first processing unit.

\* \* \* \* \*